United States Patent [19]

Kupcikevicius

[11] Patent Number: 4,649,602
[45] Date of Patent: Mar. 17, 1987

[54] STUFFING METHOD, APPARATUS AND ARTICLE FOR USE THEREWITH

[75] Inventor: Vytautas Kupcikevicius, Chicago, Ill.

[73] Assignee: Viskase Corporation, Chicago, Ill.

[21] Appl. No.: 885,753

[22] Filed: Jul. 22, 1986

Related U.S. Application Data

[63] Continuation of Ser. No. 818,905, Jan. 15, 1986, abandoned, which is a continuation of Ser. No. 495,332, May 20, 1983, abandoned.

[51] Int. Cl.[4] .............................................. A22C 11/50
[52] U.S. Cl. ......................................... 17/49; 17/1 F; 17/41
[58] Field of Search .................... 17/33, 35, 41, 42, 49, 17/1 F

[56] References Cited

U.S. PATENT DOCUMENTS

| Re. 30,390 | 9/1980  | Kupcikevicius et al. | 17/49   |
|------------|---------|----------------------|---------|
| 3,553,769  | 1/1971  | Myles et al.         | 17/49   |
| 3,748,690  | 7/1973  | Niedecker            | 17/33   |
| 3,872,543  | 3/1975  | Niedecker            | 17/33   |
| 3,975,795  | 8/1976  | Kupcikevicius et al. | 17/49 X |
| 4,077,090  | 3/1978  | Frey et al.          | 17/49 X |
| 4,164,057  | 8/1979  | Frey et al.          | 17/49   |
| 4,257,146  | 3/1981  | Karp                 | 17/49   |
| 4,307,489  | 12/1981 | Niedecker            | 17/49   |
| 4,335,488  | 6/1982  | Becker               | 17/33   |
| 4,430,773  | 2/1984  | Becker et al.        | 17/33   |
| 4,437,209  | 3/1984  | Duroyon              | 17/33 X |

FOREIGN PATENT DOCUMENTS 82105337.8 6/1982 European Pat. Off. .

OTHER PUBLICATIONS

Copending Appln. Ser. No. 430,230, filed Sep. 30, 1982.
Copending Appln. Ser. No. 430,582, filed Sep. 30, 1982.
Copending Appln. Ser. No. 456,492, filed Jan. 7, 1983.

Primary Examiner—Willie G. Abercrombie
Attorney, Agent, or Firm—R. Aceto

[57] ABSTRACT

A method and apparatus for stuffing food product into shirred casing wherein an internal sizing member and an external engaging member cooperate to provide casing presizing and casing holdback. A small relative motion between said sizing member and said engaging member controllably reduces holdback to facilitate gathering and clipping the stuffed product.

15 Claims, 3 Drawing Figures

STUFFING METHOD, APPARATUS AND ARTICLE FOR USE THEREWITH

This application is a continuation of prior U.S. application Ser. No. 818,905 filed Jan. 15, 1986 abandoned which is a continuation of application Ser. No. 495,332 filed May 20, 1983 abandoned

TECHNICAL FIELD

The present invention relates to the stuffing of flowable product into casing lengths, Such as cellulosic food casing, conventionally used to make sausages and other similar products. More particularly, the present invention relates to an improved stuffing method and apparatus for use especially in conjunction with controllably premoisturized, shirred casing.

BACKGROUND ART

Typically, stuffing apparatus is commonly used in the food industry, for example, to automatically stuff food product, e.g., meat emulsion, into a casing length deshirred from a shirred casing supply mounted over a stuffing horn. After the product is stuffed, the casing is constricted and gathered around the end of the stuffed product by closing a pair of gathering plates. The stuffed product is then closed by applying a clip around the gathered end of the casing.

An important recent development in the food packing industry has been the use with food stuffing apparatus of a controllably premoisturized, shirred casing. This particular casing has several significant advantages. First of all, there is no need to soak the casing at the processing plant immediately prior to the stuffing operation. This, of course, saves considerable time, equipment and expense in the production of stuffed products. Furthmore, since the moisture content of the casing is maintained at a controlled level, the casing tends to behave in a predictable fashion on the stuffing apparatus. Finally, since soaking is no longer a requirement, the casing can be shirred to higher pack ratios so that a greater length of casing can be shirred onto a stick of predetermined length. It will be readily apparent that this feature significantly reduces the apparatus downtime due to stick loading.

Casing which is controllably premoisturized to a commercially acceptable level, e.g., from about 15.5% to about 35%, and preferably to about 20%, of total casing weight, is much less pliable than a fully soaked casing. Unfortunately, this has given rise to certain problems in adapting existing stuffing equipment to handle the premoisturized casing. For instance, it has been found that stuffing pressures encountered with premoisturized casing may be significantly higher than those encountered when a fully soaked casing is employed to stuff the casing to the same diameter.

U.S. Pat. No. 4,007,761 to Beckman describes a solution to this problem wherein a sizing disc or ring mounted inside the casing, stretches the casing circumferentially as the casing deshirrs from the casing supply. The sizing disc or ring stretches the casing toward or even beyond its recommended stuffed circumference, which thereby causes the casing to take a temporary set. With the casing stretched to about its recommended stuffed circumference, the emulsion entering the casing need only fill the casing without much, if any, additional stretching, resulting in a substantial reduction in stuffing pressure.

Unfortunately, the placement of a sizing disc or ring inside the casing to stretch the casing creates an additional problem in that the sizing disc or ring establishes a holdback force which, if not relieved, can prevent completion of the gathering and clipping operation without damage to the casing. This problem has been solved in the past by the provision of a tension sleeve. The tension sleeve is mounted over the stuffing horn and carries the sizing disc or ring at its outer end. The tension sleeve is connected at its other end to a reciprocating mechanism which cycles the tension sleeve first aft, then fore, to create a controlled length of slack casing which, in effect, substantially reduces the holdback force developed in the casing supply during gathering. The slack casing so provided is thus available to be drawn by the gathering plates around the end of the stuffed product.

Although the provision of a tension sleeve carrying a sizing disc or ring and reciprocating fore and aft on the stuffing horn has solved the problem of a casing holdback, the solution nevertheless has been a compromise since additional space must be taken from the shirred casing length on the stuffing horn to allow for the reciprocating motion of the tension sleeve. In other words, due to its reciprocating movement, the tension sleeve is shortened and this necessarily results in the loss of available shirred casing, approaching about 25% or at least enough in most cases to considerably dilute the pack ratio advantage offered by the highly compressed controllably premoisturized casing.

U.S Pat. No. 3,748,690 to Niedecker discloses a stuffing apparatus for stuffing sausage casings and the like wherein the stuffing horn is provided with a snubbing ring adjacent to its discharge end. The snubbing ring is arranged to reduce the casing holdback immediately after completion of the filling operation in order to accommodate flowable product that is displaced during the constriction and gathering operation.

Copending application Ser. No. 273,278, now U.S. Pat. No. 4,438,545, of Kupcikevicius et al, filed on June 12, 1981 and assigned to the common assignee hereof, discloses an improved stuffing method and apparatus which is primarily adapted to the utilization of controllably premoisturized casing. In this development, a tension sleeve carrying a sizing disc or ring is provided along with a snubbing ring mounted adjacent to the discharge end of the stuffing horn. The snubbing ring serves to infold the stretched casing as it passes from around the sizing disc or ring and also provides an emulsion seal as the infolded casing passes between the snubbing ring and stuffing horn. Again, the tension sleeve is adapted to reciprocate in order to provide slack in the casing while the snubbing ring is maintained in fixed or stationary position.

DISCLOSURE OF THE INVENTION

The present invention contemplates an improved method of stuffing a flowable product, e.g., meat emulsion, into tubular casing lengths which have been shirred and mounted onto an elongated stuffing horn. The method of the present invention is carried out by mounting within the interior of the tubular casing a sizing member having an outer circumference which is larger than the casing in its initial unstuffed condition and then drawing the tubular casing over the sizing member in order to stretch the casing to about its recommended stuffed circumference. The outer circumference of the sizing member is provided with a casing contact surface area which is relatively small and which consequently reduces the force (i.e. holdback force) required to pull the casing over the sizing member. An engaging member or snubbing ring is placed around the exterior of the tubular casing in order to infold the stretched, deshirred casing after it has been drawn over the sizing member. The engaging member holds the casing against the surface of the stuffing horn to provide an emulsion seal. Further, the engaging member has an arcuate projection or extended lip which coacts with the sizing member to force the casing to follow a convoluted path. This, in turn, creates a high frictional holdback force on the casing. This holdback force, together with the holdback force created by the stretching action of the sizing member, combine to provide a total holdback force sufficient to control or regulate the internal stuffing pressure, thereby insuring that the casing will stuff out to the desired stuffed circumference.

During the stuffing operation, the engaging member is positioned in close proximity to the sizing member which is mounted inside the casing. However, the engaging member is caused to move longitudinally along the length of the stuffing horn just prior to or during the stuffed product gathering and clipping step, from its initial position adjacent to the sizing member to a point that is proximate to the discharge end of the stuffing horn. This substantially reduces the casing holdback force and thereby allows the casing to be drawn on demand from the shirred casing supply during the stuffed product gathering and clipping step.

In a preferred embodiment of the present invention, the internal sizing member is held fixed or stationary throughout the entire stuffing, gathering and clipping operation. This is made possible by the fact that the sizing member generally does not apply the major portion of the holdback force against the casing during the stretching operation. Accordingly, since the sizing member is fixed or stationary, essentially all of the space available to store the shirred casing on the stuffing horn can be readily utilized without sacrificing any space to accommodate reciprocating movement of a tension sleeve or similar device for supporting the sizing member.

In its method aspects, the present invention comprehends a method of stuffing a flowable product into continuous lengths of tubular casing which have been shirred and mounted onto an elongated stuffing horn comprising:

mounting a shirred casing supply and a sizing member onto a stuffing horn, the sizing member being mounted within an unshirred portion of the shirred casing supply and having a periphery which is larger than the circumference of the casing in its initial unstuffed condition, the casing supply comprising controllably premoisturized casing;

placing around the exterior of the tubular casing an engaging member adapted to fold the stretched unshirred casing inwardly as it passes around and over the sizing member, the engaging member having a casing contact surface area of which an optimum portion contacts the casing when the engaging member is positioned adjacent to the sizing member;

positioning the engaging member adjacent to the sizing member;

drawing the tubular casing over the sizing member and stretching the casing to about the desired stuffed circumference;

folding the stretched unshirred casing inwardly through the engaging member while maintaining the casing in contact with an optimum portion of the casing contact surface area, thereby producing a high holdback force on the casing;

filling the tubular casing with the flowable product until a predetermined length of casing has been stuffed to about the desired stuffed circumference;

moving the engaging member longitudinally along the stuffing horn from its position adjacent to the sizing member to a point proximate to the discharge end of the stuffing horn to effectively decrease the casing contact surface area actually in contact with the casing, thereby substantially reducing the holdback force on the casing; and then gathering the casing around the end of the stuffed product, and thereby pulling a necessary additional amount of casing over the sizing member to form the rear end of the just stuffed product length and the front end of the succeeding next product length to be stuffed.

The stuffing method according to the present invention may be carried out by an apparatus comprising, in combination:

an elongated stuffing horn;

a shirred casing supply mounted onto the stuffing horn, the casing supply comprising controllably premoisturized casing;

a sizing member disposed within an unshirred portion of the shirred casing supply and having an outer circumference which contacts the inner surface of the casing for stretching the casing to a predetermined dimension;

an engaging member surrounding the stuffing horn and contacting the outer surface of the stretched unshirred casing for folding the casing inwardly as it is drawn around and over the sizing member, the engaging member having a casing contact surface area, an optimum portion of which contacts the casing when the engaging member is positioned adjacent to the sizing member, thereby producing a high holdback force on the casing during stuffing;

means for controllably moving the engaging member along the stuffing horn from a position adjacent to the sizing member to a position adjacent to the discharge end of the stuffing horn in order to decrease the casing contact surface area actually in contact with the casing, thereby substantially reducing the holdback force on the casing; and means for holding the sizing member stationary on the stuffing horn.

In a preferred embodiment of apparatus according to the present invention, the interior sizing member is mounted to an end of a tubular core member which carries or supports the shirred casing supply. The tubular core member is mounted along with the casing supply over the stuffing horn and is held in stationary position thereon by suitable attachment means. Such means may include, for example, a bayonet mount arrangement for detachably fixing the inboard end of the tubular core member to a part of the apparatus.

The shirred casing supply used with the preferred embodiment may comprise a "cored high density" casing stick as described in copending U.S. application Ser. No. 363,851, incorporated herein by reference. A cored high density casing article comprises a support tube or tubular core member with a shirred casing length mounted thereon and highly compacted to a high pack ratio (at least about 100) and a high packing efficiency (at least about 0.50). Such a configuration provides a casing article having improved structual stability and strength, and it supplies additional stuffing length as compared to conventional shirred sticks.

In its article aspects, the present invention comprehends a casing article comprising in combination, an elongated tubular core member having affixed thereto at one end a conically shaped sizing member, and a continuous length of a controllably premoisturized tubular casing shirred and compacted over substantially the entire length of said tubular core member, the conically shaped sizing member being disposed within an unshirred portion of the casing and having an outer periphery of substantially fixed circumference which is larger than the interior circumference of the casing, such that the casing is stretched outwardly when the casing is drawn around and over the periphery, the periphery having a casing contact surface area which produces a minimal holdback force on the casing so that the casing can be drawn easily around and over the periphery of the sizing member when no other holdback forces are applied thereto.

The internal sizing member is preferably conical in shape as opposed to a cylindrical disc and is, preferably, made integral with the outer end of the tubular core member. This sizing member can be conveniently made by molding the sizing member in one piece with the tubular core member. Since the sizing member must stretch the casing, it must be made of a substantially unresilient material such as metal or, preferably, a rigid plastic such as high density polyethylene.

The engaging member preferably includes an annular projection which surrounds the inner circumference thereof and can coact with the internal sizing member to create a convoluted casing path. Preferably, the annular projection on the engaging member is adapted to enter the open annular space defined between the conical sizing member and the stuffing horn. This arrangement is utilized to effectively increase the convolution of the casing passage and thereby produces a significant portion of the holdback force to control or regulate the internal stuffing pressure.

DESCRIPTION OF THE DRAWING

The present invention will be described in greater detail hereinafter with particular reference to the accompanying drawing in which.

DESCRIPTION OF THE PREFERRED EMBODIMENTS

Figure 1:
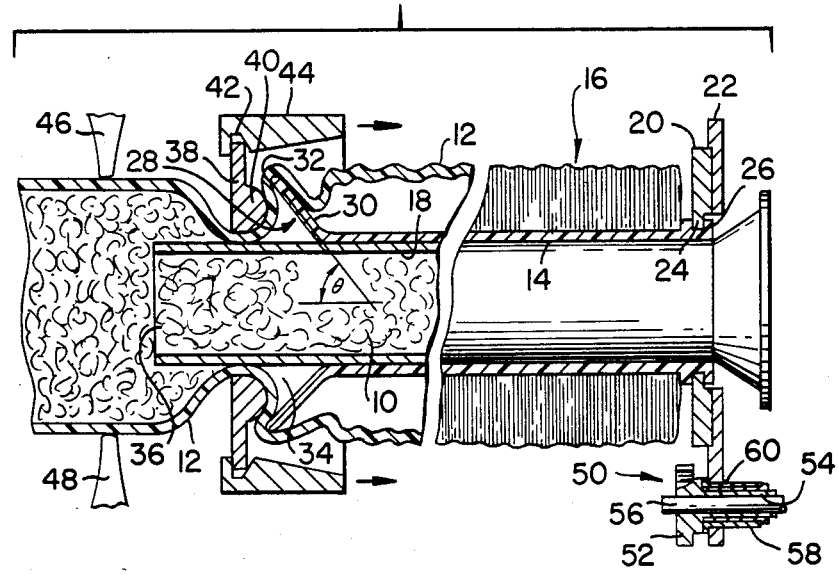
FIG. 1 is an elevational sectional view showing apparatus according to the present invention during the stuffing operation.
Figure 2:
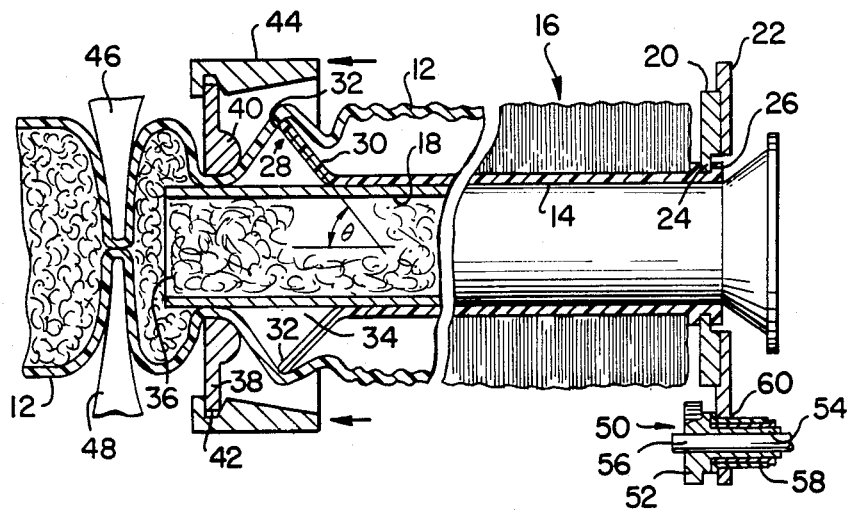
FIG. 2 is a similar view showing the same apparatus during the constriction and gathering operation.

Referring now more particularly to the drawings, there is shown in FIGS. 1 and 2 an apparatus according to the present invention for stuffing a flowable product such as a meat emulsion 10 into continuous lengths of tubular cellulosic casing 12. Preferably, the casing 12 is a controllably premoisturized casing which is shirred and compacted tightly onto an elongated plastic tube or core 14 to form a complete casing article depicted generally by the reference numeral 16. The casing article 16 is loaded onto the stuffing apparatus by placing the plastic tube or core 14 over the elongated stuffing horn 18. Only those parts of the stuffing apparatus are shown that are considered essential to an understanding of the present invention.

The casing article 16 is detachably mounted onto the apparatus by means of a pair of mounting plates 20, 22. These mounting plates each have coinciding openings through which passes the aft end of the stuffing horn 18. The outermost plate 22 is fixed to a part of the apparatus, not shown, while the other innermost plate 20 is removably secured thereto as by set screws, also not shown. The innermost plate 20 carries around the periphery of its opening an interrupted flange element 24 which forms part of a conventional bayonet mount arrangement. The inboard end of the plastic tube or core 14 is formed with similar spaced interrupted flange elements as at 26 which engage the flange element 24 and detachably lock the tube in place upon rotation.

A conically shaped sizing member 28 is disposed within the interior of the tubular casing 12. The sizing member 28 is affixed to the fore end of the elongated plastic tube or core 14 and preferably, though not necessarily, is made an integral part thereof. In the embodiment of the stuffing apparatus shown, the sizing member 28 is molded in one piece with the plastic tube or core 14. Alternatively, the sizing member 28 can be made as a separate piece and then suitably secured onto the end of the plastic tube or core 14. The sizing member 28 can also be detachably secured by suitable means to the stuffing horn if desired.

The conically shaped sizing member 28 in its preferred form includes an outwardly flared wall 30 terminating at its outer edge in a narrow, rounded peripheral rim 32. The wall 30 is disposed at an angle $\theta$ with respect to the longitudinal axis of the plastic tube or core 14 defining an open annular space 34 between the wall 30 and the outer surface of the stuffing horn 18.

The elongated plastic tube or core 14 is preferably made as long as possible in order to incorporate the maximum length of shirred tubular casing within the casing article 16. However, the plastic tube or core 14 is shorter than the overall length of the stuffing horn 18 leaving a part of the latter exposed in an area adjacent to the discharge end 36.

A snubbing ring or engaging member 38 is disposed concentrically around the exposed area on the stuffing horn 18. The engaging member 38 contacts the exterior surface of the stretched, unshirred casing 12 and infolds the casing as it is drawn from around the outer rim 32 of the sizing member 28.

The engaging member 38 is formed around its inner periphery with an annular, arcuate shaped projection 40. The annular projection 40 contacts the exterior surface of the stretched, unshirred casing 12 and, in concert with the sizing member 28, produces a holdback force on the casing. The inner periphery of the engaging member 38 also holds the casing 12 snugly around the discharge end 36 of the stuffing horn 18. This prevents back flow of the meat emulsion extruded from the stuffing horn 18, that is, the engaging member prevents the meat emulsion from entering the casing 12 at a point inboard of the engaging member 38.

The outer periphery of the engaging member 38 is secured inside an annular groove 42 formed on the inner surface of a circular carriage 44. This carriage 44 is connected to a suitable drive mechanism, not shown, which is adapted to move the carriage 44 and engaging member 38 longitudinally along the exposed area on the stuffing horn 18 in both the fore and aft direction as depicted by the arrows. The mechanism for driving the carriage 44 may be, for example, a pair of pneumatic cylinders operating in tandem or any similar device.

As the meat emulsion 10 extrudes from the discharge end 36 of the stuffing horn 18 under pressure from an emulsion pump, not shown, the meat emulsion fills the tubular casing 12 outwardly to the desired stuffing circumference. The casing 12 is continuously deshirred from the casing article 16 and is drawn over the peripheral rim 32 of the sizing member 28. The rim 32 stretches the casing outwardly to about its recommended stuff diameter and thereby reduces the internal pressure required to complete the stuffing operation. The stretched casing 12 is then infolded and continuously drawn around the arcuate annular projection or extended lip 40 of engaging member 38. The ring 38 contacts the casing and holds it snugly against the surface of the stuffing horn 18.

During the stuffing operation, the engaging member 38 is positioned adjacent to the conically shaped sizing member 28 as illustrated in the view of FIG. 1. In this positon of the engaging member 38, the extended lip 40 is placed inside the annular space 34 between the flared wall 30 and the stuffing horn 18. It will be seen by this arrangement that the infolded section of the casing 12 actually reverses direction following a convoluted path first inwardly and rearwardly as it passes through the space 34 and then in the forward direction again as the casing is drawn around the extended lip 40. This convoluted path that the casing 10 is forced to follow creates the additional holdback force which is necessary to enable the casing to be fully stuffed to the desired stuffed diameter.

As soon as the casing 12 is filled to a predetermined length with meat emulsion 10, emulsion flow is shut off and the engaging member 38 is moved along the stuffing horn 18 by the carriage 44 and its associated drive mechanism to a position close to the horn discharge end 36 as shown in the view of FIG. 2. This substantially reduces the total holdback force of the engaging member on the casing, while leaving undisturbed that portion of the total holdback force contributed by the stretching action of the sizing member.

A pair of constriction plates 46, 48, are located just ahead of the discharge end 36 of the stuffing horn 18. These plates simultaneously close together to constrict the filled casing 12 as shown in the view of FIG. 2. The extra casing required to form the rear or trailing end of the just-stuffed product length and the front end of the succeeding "next-to-be-stuffed" product length is pulled from the shirred casing supply, and over the sizing member, by the action of the constriction plates. This ability to draw casing from the shirred casing supply, as needed, is brought about by controllably eliminating a large portion of the total holdback force required for stuffing, by moving the engaging member and thereby reducing its holdback contribution through minimizing the casing contact area on the arcuate annular projection 40, as shown in FIG. 2.

A pair of clips (not shown) seal the rear end of the just-stuffed product length and the front end of the next product length, and a severing means (not shown) separates the casing between the clips. The engaging member 38 is withdrawn from the horn discharge end 36 and positioned again adjacent to the conically shaped sizing member 28. Emulsion flow is reactivated, and stuffing of the next product length commences.

While in the stuffing position shown in FIG. 1, the arcuate annular projection 40 of the engaging member 38 coacts with the sizing member 28 to force the tubular casing 12 to follow a convoluted path as it deshirrs from the casing supply. This creates a high frictional holdback force on the casing which, when coupled with the holdback force created by the stretching action of sizing member 28, provides a total holdback force sufficient to control or regulate the internal stuffing pressure, thereby insuring that the casing will stuff out to the desired stuffed diameter or stuffed circumference.

The rim 32 formed by the outer periphery of the sizing member 28 has a relatively small surface area which contacts the interior of the casing 12. While stretching the casing 12 to about its recommended stuffing circumference, the sizing member, therefore, produces a minimal holdback force on the casing. When in the constriction and gathering position shown in FIG. 2, the major portion of the total holdback force which is acting on the casing becomes that portion which is due to this stretching contact of the sizing member. This allows the constricting and gathering action to easily draw casing from the shirred casing supply over the rim 32 as required. There is, therefore, no necessity to move or reciprocate the casing supply 16 to create slack during the constriction, gathering and clipping operation. It is only necessary to move the engaging member 38 approximately ⅜-inch away from the sizing member 28 to eliminate a substantial portion of the total holdback force on the casing.

An important advantage of the above described arrangement is that it is no longer necessary to provide space for reciprocating the plastic tube or core 14. Consequently, the core can be longer and, thereby, a maximum length of shirred casing can now be applied to the plastic tube or core 14 during assembly of the casing article 14. This advantage is of significant value in the case where a controllably premoisturized, shirred casing is employed.

Although the plastic tube or core 14 is held stationary on the stuffing horn 18 throughout operation of the apparatus, it may be convenient if not necessary, to meet special user requirements, to adjust the position of the tube or core 14 and in turn the location of the conically shaped sizing member 28 with respect to the engaging member 38. This is readily accomplished in accordance with the present invention by the provision of a mounting plate adjustment mechanism 50. This mechanism may consist, for example, of a rotatable knob 52 having a tubular extension 54 mounted on a stationary shaft 56. The tubular extension 54 is threadably engaged inside a tubular sleeve 58 which in turn is fixedly secured in an opening 60 formed within the mounting plate 22. It will be seen then that by simply rotating the knob 52 either clockwise or counterclockwise, the plate 22 and, in turn, the tube or core 14 can be moved, in small increments, longitudinally in either direction along the length of the stuffing horn 18.

This movement of the tube or core 14 causes the conically shaped sizing member 28 to relocate either closer to or farther from the engaging member 38 and its projection 40, thereby controlling the amount of total holdback to be developed in the casing supply. By properly adjusting the distance between the sizing member 28 and the engaging member 38, provision is thereby made to assure that an optimum portion of the casing contact surface area on the arcuate annular projection 40 will be in contact with the infolded casing during stuffing in order to provide that the total holdback force will produce the desired stuffed casing circumference or diameter. The mechanism whereby the level of holdback contributed by the engaging member 38 is controlled, involves the amount of casing 12 which is wrapped around arcuate projection 40 as the casing moves over the sizing member 28 and past the engaging member. The closer the engaging member 38 is set to the sizing member 28, the greater the amount of casing wrap and, therefore, the higher the holdback force. Similarly, when the distance is greater, the casing wrap is less, and with a lesser casing wrap a lesser holdback force is produced.

In the practice of the present invention, the angle θ defined between the flared wall 30 and the longitudinal axis of the plastic tube or core 14 may be any angle in a range of between about 30 and 75 degrees, for example. Preferably, the angle θ is about 45°. This preferred angle provides a space 34 for creating casing holdback.

Figure 3:
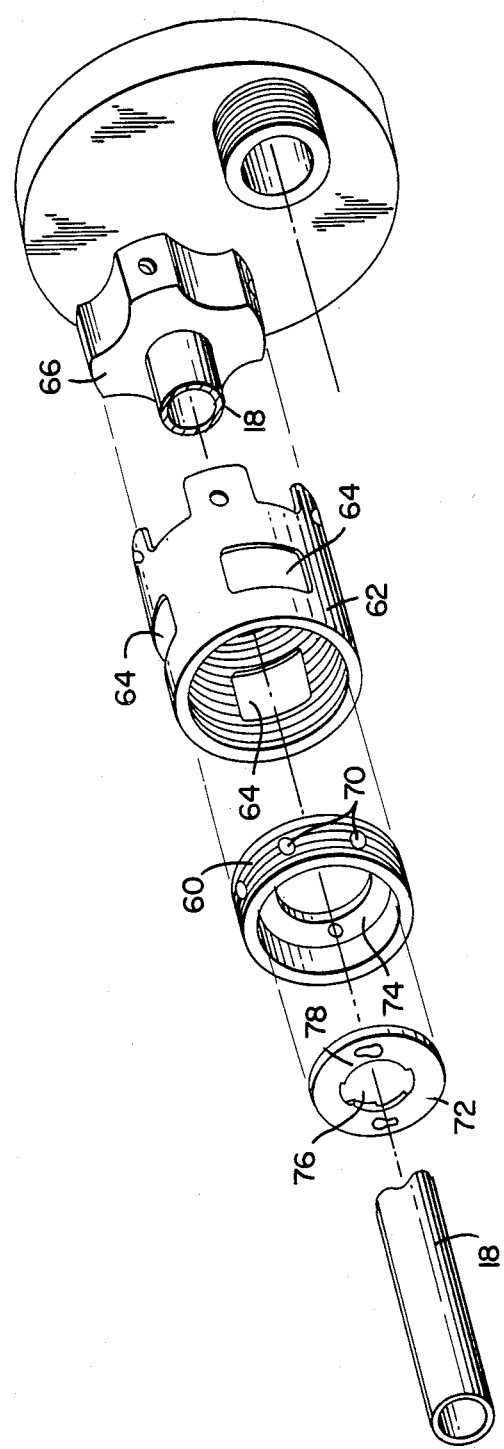
FIG. 3 is an exploded view showing an assembly for mounting and adjusting the longitudinal position of the casing article on the stuffing apparatus according to a preferred embodiment of the present invention.

An alternate and preferred assembly for detachably mounting the casing article on the stuffing apparatus and adjusting the longitudinal position of tube or core 14 is shown in FIG. 3. An internally threaded outer ring 62, provided with openings 64 about its periphery, is mounted concentric to the stuffing horn 18 and bolted to the horn attachment nut 66 of the stuffing apparatus. An externally threaded adjusting ring 60 is concentrically mounted around the stuffing horn and threadably engaged within outer ring 62. A number of adjusting holes 70 are radially bored around the periphery of the adjusting ring so that they are accessible through the openings 64 of outer ring 62 for the insertion of a rod (not shown) into a hole 70 for adjusting the position of ring 60 within ring 62 by rotating ring 60. An adapter ring 72 is, in turn, mounted concentric to the stuffing horn and bolted to the face 74 of adjusting ring 60. The adapter ring carries around the periphery of its opening 76 an interrupted flange element 78 which forms part of a conventional bayonet mount arrangement. Only the adapter ring 72 need be changed to accommodate different tubular core inboard sizes. As earlier described, the inboard end of the plastic tube or core 14 of the casing article is formed with a similar spaced interrupted flange element which engages the flange element 78 and detachably locks the tube in place upon rotation. It will be seen that by simply rotating the externally threaded adjusting ring 60, within the internally threaded outer ring 62, the adapter ring 72 and, in turn, the tube or core 14 of the casing article can be moved longitudinally in either direction along the stuffing horn 18, establishing any desired relationship between the sizing member 28 and the engaging member 38.

While a preferred embodiment has been described herein, it should be appreciated that other arrangements of a movable external engaging member and a stationary internal sizing member would fall within the scope of the claimed invention. For example, the internal sizing member could have a convoluted outer periphery which would impart little or no prestretching or holdback to the casing until an engaging member, provided with a plurality of fingers or protuberances, pressed and stretched the casing into the recessed portions of the convoluted sizing member.

Similarly, the internal sizing member can have a shape (e.g. ellipsoidal, hemispherical, etc.) other than a conical shape, as long as an annular space is provided between said sizing member and the stuffing horn to allow coaction with the engaging member, and provided that the contact area of the sizing member with the casing is roughly equivalent to that provided by the rim of a conical sizing member.

I claim:

1. A casing article comprising in combination, an elongated tubular core member having a sizing member affixed thereto at one end, and a continuous length of a controllably premoisturized tubular casing shirred and compacted over substantially the entire length of said tubualr core member, said sizing member being disposed within an unshirred portion of said casing and having an outer periphery of substantially fixed circumference which is larger than the interior circumference of said casing, said sizing member comprising a substantially unresilient wall which flares outwardly from said one end and terminates in a relatively narrow rounded rim that defines said outer periphery of substantially fixed circumference and said rim maintaining substantially line contact with the interior circumference of said casing, such that said casing is stretched outwardly when the casing is drawn around and over said rim, said substantially line contact providing a casing contact surface area which produces a minimal holdback force on said casing so that said casing can be drawn easily around and over said rim when no other holdback forces are applied to said casing.

2. The casing article of claim 1 wherein said sizing member is integral with the tubular core member.

3. The casing article of claim 1 wherein said tubular core member has means on its second end for mounting the casing article in fixed position on a stuffing horn.

4. In an apparatus for stuffing a flowable product into continuous lengths of tubular casing, the combination which comprises;

an elongated stuffing horn having an inboard end and a discharge end;

a shirred casing supply supported on a tubular core member and comprising controllably premositurized casing, said tubular core member having an inboard end and being mounted onto the stuffing horn;

a sizing member disposed within an unshirred portion of the shirred casing supply and having an outer circumference which contacts the inner surface of the casing for stretching the casing to a predetermined dimension;

an engaging member surrounding the stuffing horn and contacting the outer surface of the stretched unshirred casing for folding the casing inwardly as it is drawn around and over the sizing member, the engaging member having a casing contact surface area which contacts the casing over an optimum portion thereof when engaging member is positioned adjacent to the sizing member, thereby producing a high holdback force on the casing during the stuffing operation;

means for controllably moving the engaging member along the stuffing horn from a position adjacent to the sizing member to a position adjacent to the discharge end of the stuffing horn in order to decrease the casing contact surface area actually in contact with the casing, thereby substantially reducing the holdback force on the casing; and an internally threaded outer ring located adjacent to the inboard end of the tubular core member for holding the same in stationery position on the stuffing horn.

5. Apparatus according to claim 4 further including means for adjusting the stationary position of the tubular core member.

6. Apparatus according to claim 5 wherein the adjustment means comprises an externally threaded adjusting ring threadably engaged with the outer ring and detachably attached to the tubular core member by means coacting with the inboard end of the core member.

7. Apparatus according to claim 6 wherein the means coacting with the inboard end of the tubular core member comprises a bayonet mount engagement means.

8. In a apparatus for stuffing a flowable product into continuous lengths of tubular casing, the combination which comprises:
  (a) an elongated stuffing horn having a discharge end;
  (b) a shirred casing supply mounted on the stuffing horn and having an unshirred portion said casing supply comprising controllably premoistured casing;
  (c) a casing sizing means disposed within said unshirred portion, said sizing means including a substantially unresilient wall which flares outwardly towards the stuffing horn discharge end and which terminates in a relatively narrow round rim that defines a fixed outer circumference larger in circumference than the inner circumference of the casing in said casing supply for maintaining a continuous and substantially unresilient line contact with the inner surface of said casing and for stretching the casing to a predetermined dimension, said line contact providing a holdback force on the casing of a first minimum magnitude which allows the casing to be easily drawn around and over said rim;
  (d) a casing engaging means surrounding the stuffing horn at a position forward of said sizing means for contacting the outer surface of the stretched casing and folding the casing inwardly as the casing is drawn around and over said rim, said engaging means having a surface
    (i) which contacts the casing over an optimum portion thereof when said engaging means is positioned adjacent to said sizing means, thereby producing a holdback force on the casing of a second maximum magnitude during the stuffing operation, and
    (ii) which contacts the casing over a minimum portion thereof when said casing engaging means is positioned adjacent to the discharge end of the stuffing horn, thereby reducing the holdback force on the casing to substantially said first minimum magnitude to enable the stretched casing to be easily drawn around and over said rim;
  (e) means for controllably moving said engaging means along the stuffing horn from a position adjacent said sizing means to a position adjacent the stuffing horn discharge end; and
  (f) means for holding said sizing means stationary on the stuffing horn.

9. Apparatus according to claim 8 wherein said casing engaging means is of annular shape having an inner periphery of a size sufficient to hold the casing around the exterior surface of the stuffing horn.

10. Apparatus according to claim 9 wherein said wall provides an annular opening between said sizing means and the stuffing horn, and said casing engaging means includes an arcuate projection adapted to enter the annular opening when said casing engaging means is positioned adjacent said sizing means.

11. Apparatus according to claim 8 wherein said means for holding said sizing means stationary comprises a tubular core member extending through and supporting said shirred casing supply over its length, and the tubular core member having said sizing means affixed to a first end thereof with said wall flared outwardly from said first end.

12. Apparatus according to claim 11 further including at least one mounting plate located adjacent to a second end of the tubular core member for holding the same in stationary position on the stuffing horn.

13. Apparatus according to claim 12 further including means for adjusting the stationary position of the tubular core member.

14. A method of stuffing a flowable product into continuous lengths of tubular casing which have been shirred and mounted onto an elongated stuffing horn comprising the steps of:
  (a) mounting a shirred, controllably moisturized casing supply and a sizing member onto a stuffing horn having a discharge end, and disposing the sizing member within an unshirred portion of the shirred casing supply wherein the sizing member comprises a substantially unresilient wall which flares outwardly towards the stuffing horn discharge end and which terminates in a narrow rim that makes substantially line contact with the inner surface of the casing and that has a fixed outer circumference larger than the inner circumference of the casing in the shirred supply;
  (b) maintaining said line contact and producing thereby on the unshirred casing portion a holdback force of a first minimum magnitude so that casing can be deshirred from the shirred supply and drawn easily around and over the rim when all other holdback forces on the casing are substantially reduced thereby stretching the casing to about a desired stuffed circumference substantially equal to the circumference of the rim;
  (c) placing an engaging member around the exterior of the casing for folding the deshirred stretched casing inwardly as it passes around and over the rim, the engaging member having a casing contacting surface area
    (i) for contacting casing over an optimum portion thereof when the engaging member is positioned adjacent to the sizing member, thereby producing a holdback force on the stretched deshirred casing of a second maximum magnitude, and
    (ii) for contacting casing over a minimum portion thereof when the engaging member is positioned adjacent to the discharge end of the stuffing horn;
  (d) positioning the engaging member adjacent to the sizing member;
  (e) drawing casing from the shirred supply around and over the sizing member and against the resistance of the holdback force of said first minimum magnitude for stretching the casing to about the desired stuffed circumference;
  (f) folding the deshirred stretched casing inwardly through the engaging member while maintaining an optimum portion of the casing contact surface area in contact with the casing for producing said holdback force of said second maximum magnitude;

(g) filling the stretched deshirred casing with the flowable product until a predetermined length has been stuffed to about the desired stuffed circumference; and then (h) moving the engaging member longitudinally along the stuffing horn from its positon adjacent to the sizing member to a point proximate to the discharge end of the stuffing horn for reducing the holdback force on the casing from said maximum magnitude to about said minimum magnitude; and then (i) gathering the stretched deshirred casing around the end of the stuffed product, and thereby pulling a neccessary additional amount of casing over the rim and against the holdback force of said minimum magnitude to form the rear end of the just stuffed product length and the front end of the succeeding next product length to be stuffed.

15. Method according to claim 14 further including the step of holding the sizing member stationary with respect to the stuffing horn.

* * * * *